United States Patent [19]

Linden

[11] 4,343,924

[45] Aug. 10, 1982

[54] STABILIZED PHENOLIC RESINS FOR USE IN VAPOR PERMEATION CURING

[75] Inventor: Gary L. Linden, Upper Arlington, Ohio

[73] Assignee: Ashland Oil, Inc., Dublin, Ohio

[21] Appl. No.: 302,184

[22] Filed: Sep. 14, 1981

[51] Int. Cl.³ .......................... C08G 8/28; C08G 8/32; C08G 8/36; C08J 5/12

[52] U.S. Cl. .................................. 525/440; 427/255.6; 427/385.5; 427/386; 427/388.2; 427/388.3; 427/391; 427/393; 427/393.5; 525/437; 525/442; 525/444; 525/456; 525/460; 525/481; 525/486; 525/488; 525/489; 525/501; 525/483; 525/504; 528/139; 528/140; 528/145; 528/153; 528/155; 528/158; 528/161

[58] Field of Search ............... 525/504, 437, 440, 442, 525/444, 456, 460, 481, 486, 488, 489, 483, 501; 528/139, 140, 145, 153, 155, 158, 161; 427/255.6, 385.5, 386, 388.2, 388.3, 391, 393, 393.5

[56] References Cited

U.S. PATENT DOCUMENTS 2,657,151  10/1953  Gensel et al.
2,967,117   1/1961  Arledter et al.
3,409,579  11/1968  Robins .
3,429,848   2/1969  Robins .
3,485,797  12/1969  Robins .
3,676,392   7/1972  Robins .
3,789,044   1/1974  Taft et al.
3,822,226   7/1974  Taft et al.
3,836,491   9/1974  Taft et al.
3,874,898   4/1975  McInnes et al.
3,933,727   1/1976  Schmid .
3,948,824   4/1976  Robins .
4,179,427  12/1979  Gardikes .
4,267,239   5/1981  Thankachan et al.
4,298,658  11/1981  Thankachan et al.

FOREIGN PATENT DOCUMENTS 1351881   5/1974  United Kingdom .
1369351  10/1974  United Kingdom .

OTHER PUBLICATIONS

FATIPEC Congress 11, (1972), pp. 335-342, Taft et al.

Primary Examiner—Howard E. Schain
Attorney, Agent, or Firm—Mueller and Smith

[57] ABSTRACT

Disclosed is an improved method for coating a substrate with a film of a coating composition rapidly curable at room temperature in the presence of a vaporous tertiary-amine catalyst. The pot life of the coating composition is substantially increased without deleterious loss of properties of the ultimately cured film wherein the coating composition comprises three components. The first component is a phenol-functional condensation product of (a) a phenol-aldehyde reaction product bearing a plurality of methylol and phenol groups, and (b) a polyol, polycarboxylic acid, or polyepoxide, wherein the condensation product is reacted with a selective transmethylolating agent for substantially transforming residual methylol groups into non-active hydrogen groups. The second component is a multi-isocyanate cross-linking agent and the third component is an organic solvent. The coating composition is applied to a substrate and cured by exposure of the coated substrate to a vaporous tertiary amine catalyst.

14 Claims, No Drawings

STABILIZED PHENOLIC RESINS FOR USE IN VAPOR PERMEATION CURING

BACKGROUND OF THE INVENTION

The present invention relates to phenolic resin compositions which are curable in the presence of a vaporous tertiary amine catalyst at room temperature and more particularly to stabilizing such resins for improved pot lives thereof.

Vapor permeation cure is a method for curing specialized coatings by exposure of such surface coatings to a vaporous tertiary amine catalyst. Such curing is performed at room temperature and requires less than a minute of vaporous catalyst exposure to achieve tack-free coatings. Several prior patents show coating compositions composed of a polyhydroxy polyester and a polyisocyanate which can be vapor permeation cured. The polyhydroxy polyester often is an aromaic hydroxyl-containing polyester as aromatic hydroxyl groups are most suitable for vapor permeation curing.

One exemplary composition especially adapted for vapor permeation curing as a surface coating is found in commonly assigned British Patent No. 1,351,881. The phenol-functional polyester resin of this prior teaching is a linear polyester which has each chain end-capped with a polyether phenolic resin, such as preferably shown in U.S. Pat. No. 3,485,797. Such polyether phenolic resin is characterized by containing a large proportion of benzylic ether linkages in the ortho position relative to the phenol group. The polyether phenol resin is reacted onto both ends of the linear polyester chain to provide terminal phenol groups which react with a multi-isocyanate agent when exposed to a vaporous tertiary amine catalyst according to this British patent.

Unexpectedly, the present invention is based upon the discovery that a plurality of residual methylol groups of such polyether phenol-capped resins undesirably substantially diminish the pot life of the coating composition. The solution to such diminished pot life without significant sacrifice of ultimate coating properties is the achievement of the present invention.

BROAD STATEMENT OF THE INVENTION

The present invention is directed to a method for coating a substrate with a film of a coating composition rapidly curable a room temperature in the presence of a vaporous tertiary amine catalyst and which possesses a pot life of at least 4 hours in an open pot. Such method comprises coating a substrate with the film of the coating composition. The coating composition comprises: a phenol-functional condensation product of (a) a phenol-aldehyde reaction product bearing a plurality of methylol and phenol groups (hereinafter a resole resin), and (b) a resin containing two or more functional groups selected from hydroxyl, epoxide, or carboxylic acid. The condensation product then is reacted with a selective transmethylolating agent for substantially transforming residual methylol groups derived from said phenol-aldehyde reaction product into non-active hydrogen groups. The condensation product also is rid of substantially all water content and the catalyst used to synthesize the phenol-aldehyde product has been removed prior to its reaction with said polyol, polyepoxide, or polycarboxylic acid. Said coating composition further comprises a multi-isocyanate cross-linking agent wherein the molar ratio of phenol groups of said condensation product to the isocyanate groups of the cross-linking agent range between about 1:1 and 1:2. The coating composition additionally comprises an organic solvent for the condensation product and for the cross-linking agent. The coating then is cured by exposure of the coated substrate to a vaporous tertiary amine catalyst to rapidly cure the film at about room temperature. The pot life of the coating composition in an open pot is substantially increased by the transmethylolating agent modification of the present invention without substantial deleterious effects of curing the coating composition on the substrate to which it is coated.

DETAILED DESCRIPTION OF THE INVENTION

The effective elimination of the residual methylol groups on the condensation product provides several unexpected and beneficial results to a coating composition incorporating such modified condensation product. While prior methods for elimination of some residual methylol groups of resole resins have been proposed, such modified resole resins have not been taught to be useful in vapor permeation curing. The residual methylol groups of the condensation product clearly are very reactive with an isocyanate curing agent in the presence of a vaporous tertiary amine catalyst. Hence, effective elimination of such methylol groups would reduce the number of sites and, hence, the cross-link density of the condensation product when combined with the multi-isocyanate curing agent and cured by exposure to a vaporous tertiary amine catalyst. While it may be assumed that the increase in pot life may have been expected by reduction of reactive methylol groups, it is quite unexpected, though quite beneficial, to discover that the pot life increase has been accomplished without substantial deleterious effects on the properties of surface coatings made with such modified resins. For example, coatings made from the modified resins disclosed herein have unexpectedly good hardness and solvent resistance.

The aromatic hydroxyl-functional resin of the coating composition of the present invention is composed of two basic ingredients: a phenol-aldehyde reaction product which provides the aromatic hydroxyl groups and the main resin chain to which the phenol-aldehyde product is attached. Referring now to the phenol-aldehyde reaction product (often herein referred to as a resole resin) such phenol-aldehyde reaction product bears a plurality of methylol and phenol groups. Any conventional resole resin can find utility in the present invention. The preferred phenol-aldehyde reaction product, though, is that polyether phenol resin described in U.S. Pat. No. 3,485,797. Such polyether phenol resin is made by reacting a phenol with an aldehyde in a mole ratio of aldehyde to phenol of greater than 1 in the liquid phase under substantially anhydrous conditions with the removal of water above 100° C. and at temperatures below about 130° C. The reaction is conducted in the presence of catalytic concentrations of a soluble divalent metal salt dissolved in a reaction medium. Appropriate metal ion catalysts include, for example, lead, calcium, zinc, tin, manganese, copper, or magnesium. Whether the phenol-aldehyde reaction product used to cap the resins is a conventional resole resin or the preferred polyether phenol resin, such resins possess methylol and phenol groups.

According to the teachings of British Pat. No. 1,351,881, the resole resins are reacted with a resin which contains two or more functional groups which are epoxide, hydroxyl, or carboxylic acid groups. The reactive methylol groups of the phenol-aldehyde reaction product react with the functional groups of the resin for making an aromatic hydroxyl terminated product ideally suited for vapor permeation curing coatings as such British Patent teaches. Typical resins which are capped by the resole resins include polyesters as described in such British patent, though polyethers, and a wide variety of additional resins can be used. By suitable choice of resin ingredients, specific properties of the resole-modified resins will be chosen. Most often, the ultimate use of the coating composition will dictate the ingredients used.

Regardless of whether the functional groups of the resin are epoxy, hydroxyl, or carboxylic acid, such resin is reacted with the resole resin suitably to provide at least one molecule of the resole pendantly attached to the resin chain and preferably at least two phenol groups at either end of the chain for advantageous cross-linking with the multi-isocyanate curing agent. It has been determined that the phenol-functional condensation product resulting therefrom contains residual methylol groups. Such residual methylol groups have been determined to react with the multi-isocyanate cross-linking agent prematurely which results in unsuitable short pot lives. Advantageously for commercial practice of the present invention, pot lives of at least one-half shift, eg. 4 hours, and preferably at least one full shift is provided for a coating composition so that the workers do not have to interrupt the coating operation during their shift to reformulate large batches of the coating composition.

In order to extend the pot life of the coating compositions, a combination of three actions must be taken. Initially, the metal ion catalyst which is used in the synthesis of the preferred polyether phenol resin must be effectively removed from such polyether resin prior to its incorporation into the ultimate coating composition of the present invention. Such catalysts can be removed, for example, with the addition of phosphoric acid or other acid or like compound which is reactive with such metal ions for converting into a form easily removable therefrom. For example, phosphoric acid will form a salt with such metal ions which will precipitate from the polyether phenol resin for easy removal. Those skilled in the art will appreciate how to remove such catalysts from the resin. The second step which must be taken in order to provide such extended pot lives is the effective elimination of the residual methylol groups.

Such elimination is achieved in the present invention by the reaction of a selective transmethylolating agent for substantially transforming such residual methylol groups into non-active hydrogen groups, i.e. into groups which are not reactive with an isocyanate group. Selectivity for present purposes comprehends a transmethylolating agent which will react preferentially with residual methylol groups to the substantial exclusion of phenol groups. The preferred transmethylolating agents of the present invention are primary and secondary alcohols and carboxylic acid anhydrides, though suitable carboxylic acid esters and thiols could find use as transmethylolating agents according to the precepts of the present invention. On occasion, it may even be possible to use additional transmethylolating agents such as, for example, epoxy groups and shielded carboxyl groups, though specialized catalysts and reaction conditions may have to be developed for such additional agents. This is the case since the resin should not be subjected to conditions which would degrade it or render it ineffective as a resin for surface coating compositions. Preferred alcohols for transmethylolating the residual methylol groups include primary and secondary alkanols of $C_1$-$C_{22}$ chain length and phenols. Preferred transmethylolating agents include $C_1$-$C_8$ alkanols and especially butanol.

Reaction conditions for reacting the transmethylolating agents with the phenol-functional condensation products include temperatures of about 100°-140° C. with times often ranging from about 8-24 hours. Of course, the reaction with the transmethylolating agent is carried to sufficient completion for the elimination of substantially all methylol groups and is conducted under conditions and with agents selective only for removal of the methylol groups and not the phenol groups. Utilizing some of the preferred transmethylolating agents of the present invention, such alcohols suitably can form an azeotrope with the water of reaction for removal of such azeotrope. This desirable feature of the transmethylolating agents of the present invention satisfies the third action which must be taken for effective increase of the pot life of the coating compositions of the present invention. That is, virtually all traces of water should be removed from the coating composition as water will prematurely cause the coating composition to gel in the pot. Using transmethylolating agents which azeotrope with the reaction, then, and reaction conditions suitably high to remove such azeotrope formed, will satisfy this third requirement. Alternatively, one may use a transmethylolating agent which will not form an azeotrope, but use a solvent during the transmethylolating procedure which solvent will azeotrope with the water of reaction for removal thereof. Under either embodiment, the transmethylolating agent will selectively react with the residual methylol groups and the water of reaction and traces of water from advantageous sources will be removed for substantially increasing the pot life of the coating compositions without substantial deleterious effects on the properties of ultimate surface coatings formed therefrom.

In formulating the coating composition of the present invention, the modified phenol-functional condensation product is combined with a multi-isocyanate cross-linking agent and an organic solvent therefor. Referring now to the multi-isocyanate cross-linking agents, multi-isocyanate cross-linking agents cross link with the aromatic hydroxyl groups of the resulting adduct-capped polymer under the influence of a vaporous tertiary amine catalyst to form urethane linkages and to cure the coating. Aromatic isocyanates are necessary in order to obtain the desired rapid reaction in the presence of the vaporous tertiary amine catalysts at room temperature. For high performance coatings, initial color as well as the discoloration due to sunlight can be minimized by including at least a moderate level of aliphatic isocyanate content in the curing agent. Of course, polymeric isocyanates are employed in order to reduce toxic vapors of isocyanate monomers. Further, alcohol-modified and other modified isocyanate compositions find utility in the invention. Multi-isocyanates preferably will have from about 2-4 isocyanate groups for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p- phenylene diisocyanates, bitolylene diisocyanate, triphenylmethane triisocyanate, tris-(4-isocyanatophenyl)thiophosphate, cyclohexane diisocyanate (CHDI), bis-(isocyanatomethyl) cyclohexane ($H_6XDI$), dicyclohexylmethane diisocyanate ($H_{12}MDI$), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene and xylene diisocyanate and methyl derivatives thereof, polymethylene polyphenyl isocyanates, chlorophenylene-2,4-diisocyanate, and the like and mixtures thereof. Aromatic and aliphatic poly-isocyanate dimers, trimers, oligomers, polymers (including biuret and isocyanurate derivatives), and isocyanate functional prepolymers often are available as preformed packages and such packages are suitable for use in the present invention also.

The ratio of aromatic hydroxyl equivalents from the phenol-functional compound to the isocyanate equivalents of the multi-isocyanate cross-linking agent should be greater than 1:1 and can range on up to about 1:2. The precise intended application of the coating composition often will dictate this ratio or isocyanate index. At high cross-linking densities or isocyanate equivalents, harder but relatively inflexible films are produced while at lower cross-linking densities or isocyanate equivalents flexibility of the films increases. Optimizing the particular property or combination of properties desired can be determined as those skilled in this art will appreciate.

The solvent or vehicle for the coating composition is a volatile organic solvent mixture which preferably includes ketones and esters for minimizing viscosity of the composition. Some aromatic solvents may be necessary and typically are a part of the volatiles in commercial isocyanate polymers. For the polyol resin, suitable solvents include, for example, methyl ethyl ketone, acetone, methyl isobutyl ketone, ethylene glycol monoethyl ether acetate (sold under the trademark Cellosolve acetate) and the like. Some solvents can be too volatile so that mixtures may be preferred. For the polyisocyanate, conventional commercially available solvents therefor include toluene, xylene, Cellosolve acetate, and the like. Such aromatic solvents are quite compatible with the preferred ketone and ester solvents for the polyester resin when the two packages are mixed together in the pot. Sufficient solvent is added in order to bring the non-volatile solids content to the coating composition down to about 50-65% by weight at application viscosity. It should be noted that the effective non-volatile solids content of the coating composition can be increased by incorporation of a relatively low or non-volatile (high boiling) ester plasticizer which is retained for the most part in the cured film. Suitable such ester plasticizers include, for example, dibutyl phthalate, di(2-ethylhexyl)phthlate [DOP], tri(2-ethylhexyl) moleate [TOM], and the like. The proportion of ester plasticizer should not exceed about 5-10% by weight, otherwise loss of mar resistance can occur.

The thus-formulated coating composition possesses a pot life in an open pot of at least 4 hours and generally such pot life exceeds 8 hours and can range on up to 18 hours or more. As noted above, such long pot lives means that refilling the pot at the plant during shifts generally is not required. Moreover, the pot life of the coating composition in a closed container generally exceeds one month. After storage of the coating composition, the stored composition can be cut to application viscosity with suitable solvents and such composition retains all of the excellent performance characteristics which it initially possessed. Such long pot lives means that it is unnecessary to use a two-head spray unit or the like for applying the coating composition.

A variety of additives can be included in the coating composition. The coating composition can contain opacifying pigments and inert extenders such as, for example, titanium dioxide, zinc oxide, clays such as kaolinite clays, silica, talc, and the like. Additionally, the coating composition can contain corrosion inhibiting pigments, plasticizers, flow leveling agents, surfactants, tinctorial pigments, and a wide variety of conventional coating additives. The finally compounded coating composition (phenol-functional resin, curing agent, solvent, and optional additives) possesses an excellent pot life of at least 4 hours in an open pot and often on up to 8-18 hours or longer.

The coating composition of the present invention can be cured in the presence of a tertiary amine such as, for example, triethyl amine, dimethyl ethyl amine, cyclohexyl dimethyl amine, methyl diethyl amine, and the like, by exposure thereto for times ranging from as short as 5 seconds on up to 30 seconds or longer (eg. about 2 minutes). The coating composition thus cured may be immediately handled without fear of deleterious tackiness or blocking of the cured film.

In practicing the present invention, the coating composition is applied to the substrate by direct roll coat or curtain coating with or without knife, reverse roller coat, atomized application, or like conventional technique. Use of a two-head spray equipment is unnecessary since the coating composition of the present invention possesses such an excellent pot life. After the film is applied to the substrate, the coated substrate is passed through a zone or region which contains the vaporous tertiary amine. Representative vapor curing chambers for vapor curing the coating include those shown in U.S. Pat. Nos. 3,851,402 and 3,931,684, the disclosures of which are expressly incorporated herein by reference. The vaporous tertiary amine often is admixed with a carrier gas, such as an inert gas like nitrogen or carbon dioxide, in order to facilitate its dispersion in the curing chamber as well as for minimizing the chance of explosion. The saturated atmosphere in the curing chamber normally will contain the vaporous tertiary amine in a proportion of between about 2% and 12% with catalyst concentrations somewhere in the range of 4-8% being preferred. Room temperature may be maintained during the entire sequence of operations from coating, to curing of the coated substrate. An advantage of room temperature curing of the coating is that application to thermoplastic substrates which are sensitive to heat can be practiced. In this regard, substrates suitable for being coated by the coating composition of the present invention includes, for example, metal, thermoplastic, hardboard or fiberboard, paper, thermosetting material and the like.

As will be shown in the Examples which follow, the modified resins of the present invention possess improved pot lives. Unexpectedly, though, the reaction with the transmethylolating agent does not substantially interfere with the ultimate curing reaction with the multi-isocyanate agent on the substrate in the presence of the vaporous tertiary amine catalyst and the performance of the coating is not substantially altered by the diminished cross-link density of the phenol-functional resin. As will be shown in the Examples which follow, unexpectedly good hardness and solvent resistance of the coating composition is retained despite its modification. The following Examples show how the present invention can be practiced but should not be construed as limiting. In this application, all units are in the metric system and all percentages and proportions are by weight, unless otherwise expressly indicated. In this application, all references cited herein are expressly incorporated herein by reference.

IN THE EXAMPLES

EXAMPLE 1

A series of phenol-functional resins were synthesized from the following ingredients:

TABLE 1

| Ingredient | Resin No. (moles) | | | | | | | | | | |
|---|---|---|---|---|---|---|---|---|---|---|---|
| | 140 | 142 | 194 | 196 | 200[7] | 200B | 46 | 79 | 83 | 111 | 113 |
| NPG[1] | 2 | — | — | 5 | — | — | — | 4 | 5 | 5 | — |
| Adipic Acid | 2 | 7 | 7 | 4 | 7 | 7 | 7 | 7 | 3.5 | 3.5 | — |
| PG[2] | 1.1 | — | — | — | — | — | 6 | — | — | — | — |
| iso-Phthalic Acid | 1 | — | — | 4 | — | — | 6 | — | 3.5 | — | — |
| Cardura E[3] | 1 | — | — | 1 | — | — | — | 2 | 1 | 1 | — |
| PEP[4] | 2 | 2 | 2 | 2 | 2 | 2 | 2 | 2 | 2 | 2 | 2 |
| TMP[5] | — | 2 | 2 | 2 | 2 | 2 | 2 | 2 | 2 | 2 | 2 |
| 1,4-BD[6] | — | 6 | 6 | — | 6 | 6 | — | — | — | — | 6 |
| Azelaic Acid | — | — | — | — | — | — | — | — | — | — | 6 |

[1]neo-pentyl glycol
[2]propylene glycol
[3]Cardura E is a glycidyl ester of Versatic 911 acid which is reported to be a mixture of aliphatic, mostly tertiary, acids 9–11 carbon atoms (Cardura and Versatic being trademarks of Shell Chemical Company, New York, New York)
[4]Phenolic resin is a phenol formaldehyde resin corresponding to the phenolic benzylic ether resin of U.S. Pat. No. 3,948,824 and synthesized generally according thereto with the catalyst having been removed by the addition of phosphoric acid. Though such resin is particularly adapted for foaming, such characteristic is not considered important for present purposes. The following specifications apply to the phenolic polyol:

| | |
|---|---|
| Viscosity (25° C.) | 50,000 ± 25,000 cps. |
| $H_2O$ | 1.5% |
| OH no. | 500–550 |
| Color | light yellow, clear |
| % free phenol | 14% |
| % free formaldehyde | 0.5% |

[5]trimethylolpropane
[6]1,4-butane diol
[7]Resin 200 is a physical mixture of the PEP resin and a polyester synthesized from the remaining indicated ingredients.

All of the resins (except for Resin No. 200) had the PEP resin reacted onto the polyester backbone synthesized from the remaining ingredients. Resins 79, 83, 111, and 113 additionally were reacted with butanol at about 140° C. with azeotropic distillation of the water-butanol mixture.

EXAMPLE 2

Each of the phenol-functional resins of Example 1 were formulated into coating compositions as follows:

TABLE 2

| | COATING COMPOSITION (g) | | | | | | | | | | |
|---|---|---|---|---|---|---|---|---|---|---|---|
| Ingredient | 140 | 142 | 194 | 196 | 200 | 200B | 46 | 79 | 83 | 111 | 113 |
| Polyol | 31.1 | 35.3 | 32.24 | 36.19 | 30.32 | 34.63 | 32.8 | 43.5 | 40.2 | 32.1 | 34.1 |
| Curing Agent[1] | 40.2 | 40.2 | 40.2 | 40.2 | 40.2 | 40.2 | 40.2 | 40.2 | 40.2 | 40.2 | 40.2 |
| Cellosolve Acetate[2] | 30.0 | 30.0 | 30.0 | 30.0 | 25.0 | 30.0 | 30.0 | 15.0 | 20.0 | 20.0 | 20.0 |

[1]Mixture of Mondur HC isocyanate and Desmodur L-2291A isocyanate (160:26 parts by weight ratio respectively); Mondur HC isocyanate is the tetrafunctional reaction product of hexamethylene diisocyanate and toluene diisocyanate (11.5% NCO content, eqivalent weight of 365, 60% solids in Cellosolve acetate/xylene), Mobay Chemical Company, Pittsburgh, Pa. Desmodur L-2291A isocyanate is an aliphatic polyfunctional isocyanate of the hexamethylene diisocyanate biuret type, Mobay Chemical Company, Pittsburgh, Pa.
[2]Cellosolve acetate (urethane grade) is ethylene glycol monoethyl ether acetate, Union Carbide Corporation, New York, New York.

The coating compositions reported in Table 2 were left in an open pot and their viscosities measured initially and periodically thereafter in order to adjudge their pot lives. The following results were recorded.

TABLE 3

| | VISCOSITY (cps) | | | | |
|---|---|---|---|---|---|
| Coating No. | Immed. | 4 hr. | 24 hr. | 48 hr. | 72 hr. |
| 140 | Gel - 20 min. | — | — | — | — |
| 142 | Gel - 20 min. | — | — | — | — |
| 194 | 103 | 167.5 | 3550 | Gel | — |
| 196 | 110 | 158.5 | 608 | $10^5$ | Gel |
| 200 | 120 | 139 | $10^5$ | Gel | — |
| 200B | 93.5 | 263 | Gel | — | — |
| 46 | 87 | 126.5 | 377 | Gel | — |
| 79 | 132.5 | 184.0 | 461.5 | 1175 | Gel |
| 83 | 131 | 171.5 | 428.5 | 1950 | gel |
| 111 | 76.5 | 115 | 547 | Gel | — |
| 113 | 91.5 | 153.5 | 1700 | Gel | — |

The above-tabulated results revealed that consistently longer pot lives are achieved by the butylation technique employed as indicated by coatings Nos. 79, 83, 111, and 113.

In order to show the excellent hardness and solvent resistance of the modified coatings, the following tests were conducted.

TABLE 4

| Coating No. | Cure Time (sec.) | Sward Hardness[1] RT[3] | Sward Hardness[1] HT[4] | MEK Rub[2] RT | MEK Rub[2] HT |
|---|---|---|---|---|---|
| 111 | 30 | 62 | 78 | 100+ | 100+ |
| 113 | 30 | 62 | 66 | 100+ | 100+ |

[1] Plate glass is defined as 100 Sward Hardness.
[2] Methyl ethyl ketone (MEK) wetted rag rubbed over one area of cured film with moderate thumb pressure until glass substrate is visible.
[3] RT is room temperature.
[4] HT: Samples held at 160° C. for 5 minutes after vaporous amine catalyst exposure, then allowed to cool for 3 days at room temperature prior to testing.

TABLE 5

| | SOLVENT RESISTANCE[1] | | | | | | | |
|---|---|---|---|---|---|---|---|---|
| | H₂O | | 5% NaOH | | 10% H₂SO₄ | | Xylene | |
| Coating | RT | HT | RT | HT | RT | HT | RT | HT |
| 111 | Pass | Pass | Fail | Fail | Pass | Pass | Pass | Pass |
| 113 | Pass | Pass | Pass/Fail | Pass | Pass | Pass | Pass | Pass |

[1] The indicated solvent in a pool on the coating is placed under a watch glass for 24 hours at ambient indoor temperature (RT) or at 160° C. (HT) and then the solvent resistance of the coating is judged.

The results reported in Tables 4 and 5 show the unexpected good properties retained by the coatings despite the resin modification with butanol. The coatings were 1 mil thick (dry) cured by exposure to vaporous triethylamine catalyst carried by ether N₂ or CO₂ carrier gas in a gas curing chamber.

I claim:

1. A method for coating a substrate with a film of a coating composition rapidly curable at room temperature in the presence of a vaporous tertiary-amine catalyst and possessing a pot life of at least 4 hours in an open pot, which comprises:
   (A) coating said substrate with said film of said coating composition, said coating composition comprising:
     (1) a phenol-functional condensation product of
       (a) a phenol-aldehyde reaction product bearing a plurality of methylol and phenol groups, and
       (b) a polyol, polycarboxylic acid, or polyepoxide, said condensation product then being reacted with a selective transmethylolating agent for substantially transforming residual methylol groups into non-active hydrogen groups, said condensation product also being rid of substantially all water content;
     (2) a multi-isocyanate cross-linking agent, where the molar ratio of phenol groups of said condensation product to said isocyanate groups of said cross-linking agent ranges between about 1:1 and 1:2; and
     (3) an organic solvent for said condensation product and for said cross-linking agent; and
   (B) exposing said coated substrate to a vaporous tertiary-amine catalyst to rapidly cure said film at about room temperature.

2. The method of claim 1 wherein said phenol-aldehyde reaction product is characterized by having a multiplicity of benzylic ether linkages in the ortho position relative to said phenol groups and said residual methylol groups are preponderantly in the ortho position relative to said phenol groups.

3. The method of claim 2 wherein said phenol-aldehyde reaction product is the reaction product of an aldehyde with a phenol in a mole ratio of aldehyde to phenol of greater than 1 in the liquid phase under substantially anhydrous conditions with removal of water above 100° C. and at a temperature below about 130° C. in the presence of catalytic concentrations of a soluble divalent metal salt dissolved in the reaction medium.

4. The method of claim 3 wherein said metal salt is of lead, calcium, zinc, tin, manganese, copper, or magnesium.

5. The method of claim 4 wherein said metal catalyst is removed from said phenol-aldehyde reaction product prior to making said coating composition.

6. The method of claim 1 wherein said transmethylolating agent is selected from a primary or secondary alcohol, a carboxylic acid anhydride, a carboxylic acid ester, and a thiol.

7. The method of claim 6 wherein said transmethylolating agent is a primary or secondary $C_1$-$C_{22}$ alkanol or a phenol.

8. The method of claim 7 wherein said transmethylolating agent is a $C_1$-$C_8$ alkanol.

9. The method of claim 8 wherein said transmethylolating agent is butanol.

10. The method of claim 1 wherein substantially all water content of said phenol-functional condensation product is removed prior to making said coating composition.

11. The method of claim 1 wherein said multi-isocyanate cross-linking agent comprises between about 10% and 80% by weight of an aromatic multi-isocyanate and between about 90% and 20% by weight of an aliphatic multi-isocyanate.

12. The method of claim 11 wherein the ratio of said aromatic hydroxyl groups to said isocyanate groups is between about 1:1.1 and 1:1.7.

13. The method of claim 1 wherein said tertiary amine catalyst is selected from triethyl amine, dimethyl ethyl amine, methyl diethylene amine, or mixtures thereof.

14. The method of claim 1 wherein said organic solvent comprises a ketone, a carboxylic acid ester, an aromatic solvent, or mixtures thereof.

* * * * *